United States Patent [19]

Rodgers

[11] 4,388,031
[45] Jun. 14, 1983

[54] BLIND FASTENER DEVICE

[76] Inventor: Earl T. Rodgers, 3172 Meadowbrook Dr., Concord, Calif. 94523

[21] Appl. No.: 193,654

[22] Filed: Oct. 3, 1980

[51] Int. Cl.³ .............................................. F16B 13/06
[52] U.S. Cl. ........................................ 411/43; 411/57
[58] Field of Search ...................... 411/43, 57, 70, 44, 411/38, 34

[56] References Cited

U.S. PATENT DOCUMENTS

| 2,370,776 | 3/1945 | Carlson | 411/34 X |
| 3,129,630 | 4/1964 | Wing et al. | 411/43 |
| 3,390,601 | 7/1968 | Summerlin | 411/43 |

FOREIGN PATENT DOCUMENTS

| 518531 | 1/1921 | France | 411/57 |
| 1307435 | 9/1962 | France | 411/43 |
| 1553116 | 12/1968 | France | 411/44 |
| 786997 | 11/1957 | United Kingdom | 411/43 |

Primary Examiner—Ramon S. Britts

Attorney, Agent, or Firm—Owen, Wickersham & Erickson

[57] ABSTRACT

A blind fastener assembly for securing together panels or sheets of material which may have the same or different hardness and thickness and also for attaching articles to panels or walls of relatively soft material. The assembly includes a hollow rivet body having a fixed head portion at one end and longitudinally separable and spreadable sectors formed by axial slots at the opposite end of the rivet body. An elongated pin located within an axial cavity of the rivet has an enlarged tapered end portion. Between the pin end portion and the opposite end of the rivet body is a deformable sleeve member adapted to bear against the inner end of the rivet. Axial pulling force on the pin causes its tapered end portion to compress and deform the sleeve against the inner slotted end of the rivet body and ultimately causes its longitudinal sectors to spread apart. Continued pulling force causes the deformable sleeve to enlarge in diameter so as to press the separated body portions firmly against the surface surrounding the rivet, thereby anchoring it in place.

6 Claims, 13 Drawing Figures

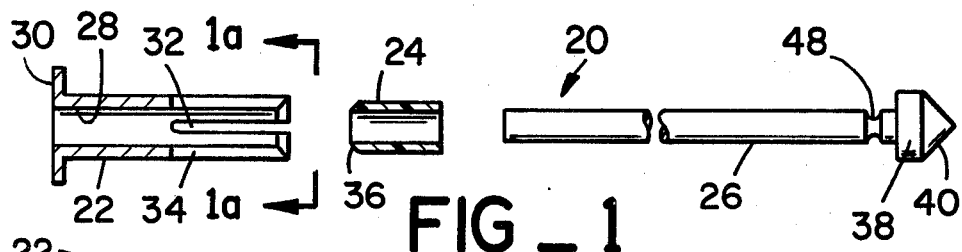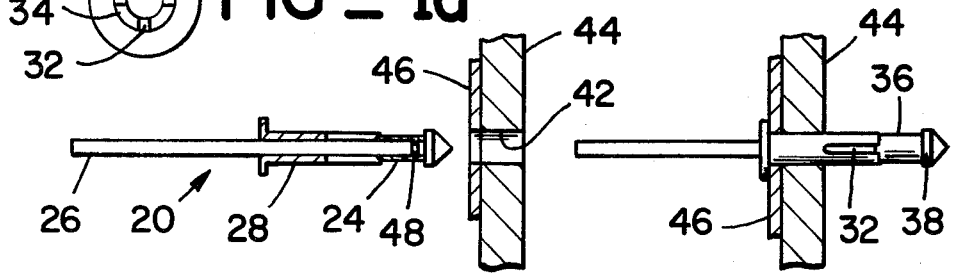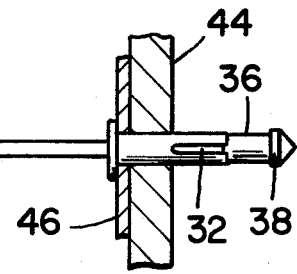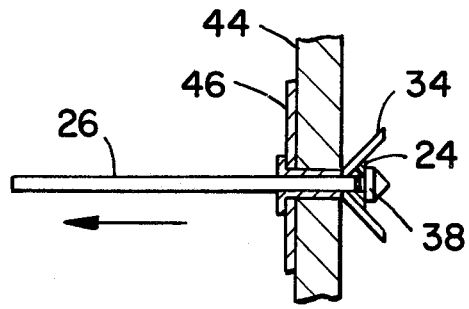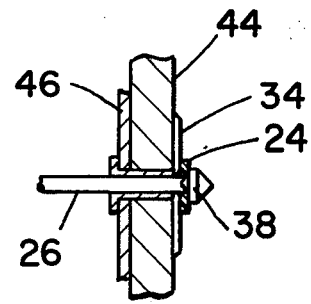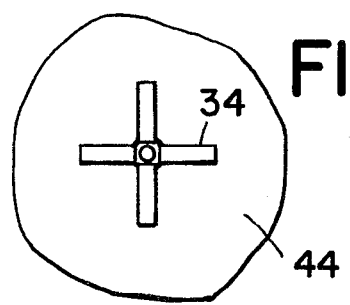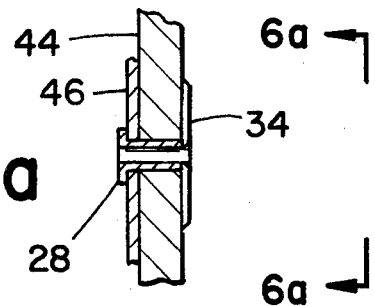

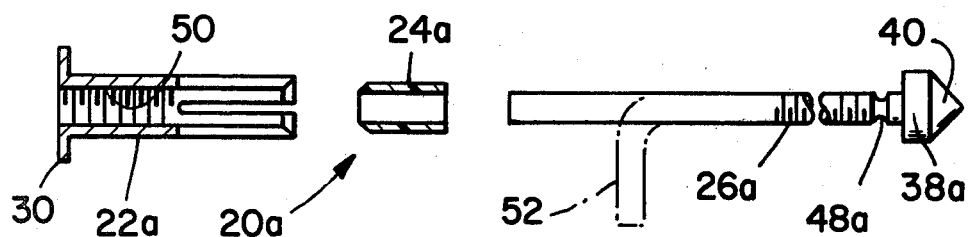
FIG_7
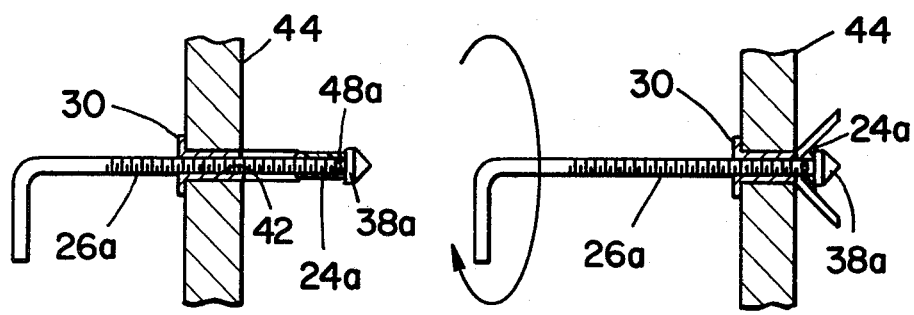
FIG_8  FIG_9
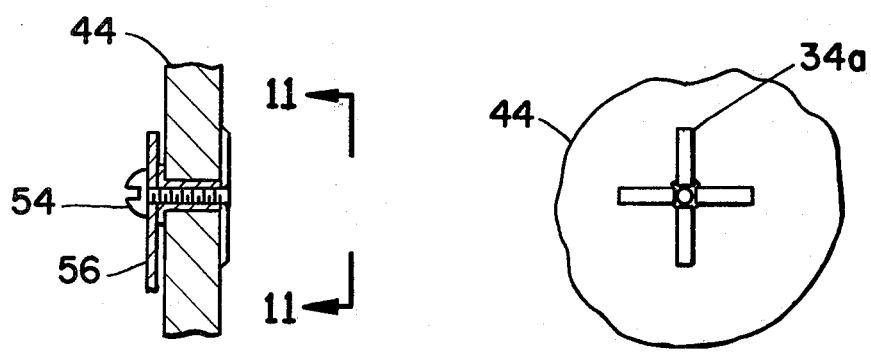
FIG_10  FIG_11

BLIND FASTENER DEVICE

BACKGROUND OF THE INVENTION

This invention relates to improvements in blind fastener devices and more particularly to such devices primarily used to secure two or more panel members together.

Various types of blind fasteners have been developed including the well known "pop-rivet" fasteners such as those commonly used for aircraft in holding together metal structures. Heretofore, such "pop-rivet" fasteners were unsatisfactory for securing together panel members of relatively soft material such as plaster board, primarily because the inner, enlarged end of the pop-rivet could not be made large enough to provide a secure anchor and resist being pulled through the rivet hole. Other fasteners developed for relatively soft materials such as the well known "molly-bolt" are often effective but have several disadvantages. For example, they usually require a fairly large pre-drilled hole through the panel materials and thereafter a screw member must be turned by a considerable amount in the usual time-consuming manner to deform and seat the retaining legs. Also, such "molly-bolt" devices are relatively complicated structurally and hence expensive, a not insignificant factor where large numbers of such fasteners are required.

BRIEF SUMMARY OF THE INVENTION

The present invention solves the aforesaid problems with an improved blind fastener device that is highly effective for securing together a plurality of panels or mechanical members, or attaching an article to a panel or wall member, particularly panel members of relatively soft material such as plaster board, sheet rock or the like. In general, the fastener according to my invention comprises a rivet-like, tubular body having a flared head at one end and a series of longitudinal slits from some point spaced from the head to its other end. An elongated pin with a tapered head end extends through the body and also through a deformable sleeve member located between the pin head and the inner end of the body. When initially installed, the tapered pin head enables the entire fastener assembly to be driven through the relatively soft panel members that are to be secured, preferably with an augering type action and far enough so that the head of the rivet-like body is flush against the outer panel surface while the inner end of the body and the pin head extend beyond the surface of the inner panel. Now, with the rivet body head held in position, a tool is used to apply a pulling force on the pin as the body is held in place and this forces the deformable sleeve against the split end of the rivet body. The ends of the body are initially spread apart by the sleeve as tension on the pin is increased to draw the sleeve against the end of the body. As this occurs, the sleeve deforms and increases in diameter. This action splays apart the split end portions of the rivet body and presses them against the inside surface of the innermost panel. The pin may be provided with a weakened section at some convenient location along its length so that it can be broken off at this point to leave only the rivet head after the end portions of the body have been splayed apart into their fastened position. The interior of the body may be formed with external threads so that a screw can be threaded therein after removal of the pin, thereby enabling other things to be mounted on the outermost panel. The invention may also be embodied in structural arrangements utilizing a multiplicity of panels with spacers, as well as other configurations.

Other objects, advantages and features of the invention will become apparent from the following detailed description thereof presented in conjunction with the accompanying drawing.

BRIEF DESCRIPTION OF THE DRAWING

FIG. 1 is an exploded view in elevation of a fastener assembly according to the invention;

FIG. 1a is a view in section taken along line 1a—1a of FIG. 1;

FIG. 2 is a view in elevation and in section of an assembled fastener device according to the invention as it is about to be installed;

FIG. 3 is a view similar to FIG. 2 showing the fastener when initially placed through a wall member;

FIG. 4 is a view similar to FIG. 3 showing the fastener when partially installed with its split body members spread apart;

FIG. 5 is a view similar to FIG. 4 showing the fastener fully installed with the pin still in place;

FIG. 6 is a view similar to FIG. 5 showing the installed fastener with the pin removed;

FIG. 6a is a view taken along line 6a—6a of FIG. 6;

FIG. 7 is an exploded view in elevation and in section of a modified form of a fastener assembly according to my invention;

FIG. 8 is a view in elevation and in section showing the fastener assembly of FIG. 7 partially installed;

FIG. 9 is a view similar to FIG. 8 showing split portions of the fastener body partially splayed apart;

FIG. 10 is a view similar to FIG. 9 showing the fastener fully installed with a retaining screw in place; and FIG. 11 is a view taken along line 11—11 of FIG. 10.

DETAILED DESCRIPTION OF THE PREFERRED EMBODIMENTS

With reference to the drawing, FIG. 1 shows an exploded view of a fastener 20 embodying the principles of the present invention and before it is installed to provide an anchoring device in soft wall material or to attach an article to a plane surface. In general, the fastener assembly comprises an elongated, hollow body member 22, a deformable sleeve member 24 and a central pull pin 26. The body member has a central bore 28 and an enlarged annular flange or head 30 at one end and is made from a relatively soft and readily bendable metal such as aluminum, copper, or a relatively soft steel. Extending longitudinally from the end opposite to its head is a series (preferably four) of slots 32 that divide the body member into sectors 34 and these slots terminate at a predetermined distance from the end of the body. The ends of the sectors 34 are preferably provided with inwardly convergent surfaces, as shown in FIG. 1.

The sleeve member 24 is made of a strong but deformable or flowable metal or plastic material such as a soft aluminum or polyethelene plastic and has a length somewhat greater than its diameter (e.g., around two times). The end of this sleeve member adjacent the slotted end of the body member 22 is provided with an annular tapered surface 36 that will engage the inwardly convergent surfaces of the body sectors 34.

The central pin 26 of the fastener assembly 20 is preferably formed from a strong, relatively hard metal capable of withstanding a relatively high degree of tension. At its inner end, adapted to bear against the non tapered end of the sleeve member 24, this pin has a circular head portion 38 of a larger diameter than its shank. The head portion also, preferably, has an outer tapered surface 40 to enable the fastener assembly to be forced through a layer of relatively soft panel material such as plaster or gypsum wallboard.

When the fastener 20 is assembled and ready for use, as shown in FIG. 2, the pin fits slidably through the body member 22 and sleeve member 24 with an extended portion of the shank 26 projecting from the head end 30 of the body.

The fastener 20 may be used for many purposes, such as attaching an article to a wall member or for connecting together two or more structural members. It is particularly useful where relatively soft or frangible material is encountered, such as when anchoring devices or articles on plywood or gypsum board walls. In such an application, as shown typically in FIGS. 2-6, a hole 42 may be initially drilled through a wall 44 of uniform thickness, just large enough to accommodate the fastener assembly. In some instances, the assembly can be merely forced through the wall. Now, with the fastener in the wall hole 42, as shown in FIG. 3, its body head 30 will be flush against the outer surface of an outer member 46 being attached thereto. The other end of the fastener body extends beyond the inner surface of the primary wall 44 and is normally blind to the installer. Preferably, the body member is sized so that the slots 32 forming its end sectors 34 extend from just beyond the inside surface of the inner wall material 44, (See FIG. 3). Tension is now applied to the outer end of the pin 26 by a suitable means such as a well known "pop-rivet" tool (not shown) that clinches the shank of the pin 26 and pulls it axially. This forces the head 38 of the pin against the plastic sleeve 24 which in turn bears against the slotted end of the body member. As the axial pin force increases, the plastic sleeve 24 forces apart the body sectors 34, as shown in FIG. 4. Continued force by the pin tension means causes the plastic sleeve to deform in shape and enlarge its diameter. This deformation of the sleeve member acting on the fastener body segments 34 causes them to splay apart and eventually bend approximately 90° to flatten against the inside surface of the wall member 44, as shown in FIGS. 5 and 6. Simultaneously, the head end of the fastener body is pulled firmly against the outer member 46 that is being retained on the wall. The pin is preferably provided with a weakened area 48 at some preselected location on its shank portion so that further tension provided after the sectors have fully splayed apart will cause the pin to break. This allows the head portion 38 of the pin 26 to fall off from the blind side of the fastener and the shank portion of the pin can be removed from the outer side. Thus, it is seen that the fastener 20 can be utilized to attach two structural members together, such as two thicknesses of wall material, or to anchor an article 46 to a wall 44 made of relatively soft material.

In a somewhat modified form of the invention, as shown in FIGS. 7-11, a fastener 20a is provided with a body 22a, having a threaded bore 50 rather than a smooth bore. In this embodiment, a central pin 26a may have a smooth shank, as shown in the previous embodiment, or it may have threads which match those of the body. In the latter instance, the pin itself may be bent at its outer end 52 so as to be easily turnable by hand or a suitable tool. A deformable plastic sleeve 24a is provided as with the previous embodiment and the pin has an inner head end that is preferably tapered. Thus, once the fastener 20a is initially installed in a wall hole 42, the pin 26a can be rotated within the body member 22a to draw the pin head end 38a axially against the deformable sleeve 24a. In the same manner as in the previous embodiment, the sleeve 24a will then deform and enlarge in diameter to splay apart and press the body sectors 34a against the back side of the wall member 44, thereby securing the fastener firmly in place. Continued turning of the pin will cause it to break at a preselected weakened area 48a. Thereafter, the outer portion of the pin can be removed and a machine screw 54 can be inserted to retain an article 56 that is to be supported by the fastener on the wall 44.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A fastener device for installation in at lease one structural member to hold it to another member or to provide an anchor therein, said device comprising:
   a main rivet body formed of relatively soft and readily bendable material having an enlarged head at one end with a central bore and a series of spaced apart slot means extending axially from its other end throughout a substantial portion of the axial extent of said rivet body to form bendable sectors;
   an elongated pin substantially longer than said rivet body, having a shank with a constant diameter and an enlarged integral pin head at one end having a bearing shoulder extending at substantially right angles to the longitudinal axis of said pin, said pin shank being adapted to extend through said central bore of said rivet body;
   a generally cylindrical sleeve shaped member of readily, deformable flowable material surrounding said pin located between and axially aligned with said bendable sectors of said rivet body and said pin head bearing shoulder, the diameter of said bearing shoulder being substantially at least as great as the outer diameter of said sleeve shaped member, said sleeve shaped member having an external frusto conical surface on one end adjacent to and engageable with an internal frusto conical surface at the end of said rivet body having said slot means, said sleeve shaped member being adapted to press against and splay apart said bendable sectors by becoming progressively larger in diameter when compressed by axial force exerted against one end of said sleeve member by said pin head;
   whereby said bendable sectors are caused to extend radially from said rivet body and pressed generally flat against the inner surface of said structural member.

2. The fastener device as described in claim 1 wherein said sleeve shaped member is made of a deformable synthetic plastic material.

3. The fastener device as described in claim 1 wherein said sleeve shaped member has a length approximately two times its diameter.

4. The fastener device as described in claim 1 wherein said sleeve shaped member has a diameter substantially equal to the diameter of said rivet body.

5. The fastener device as described in claim 1 wherein said pin has a smooth shank and forms a loose sliding fit with a smooth bore of said rivet body.

6. The fastener device as described in claim 1 wherein said pin has a threaded shank that engages a threaded bore of said rivet body.

* * * * *